(12) United States Patent
Iwazaki et al.

(10) Patent No.: US 9,493,139 B2
(45) Date of Patent: Nov. 15, 2016

(54) WIPER APPARATUS

(75) Inventors: Koji Iwazaki, Kiryu (JP); Jun Abe, Kiryu (JP)

(73) Assignee: Mitsuba Corporation, Gunma (JP)

( * ) Notice: Subject to any disclaimer, the term of this patent is extended or adjusted under 35 U.S.C. 154(b) by 181 days.

(21) Appl. No.: 14/344,206

(22) PCT Filed: Aug. 8, 2012

(86) PCT No.: PCT/JP2012/070233
§ 371 (c)(1),
(2), (4) Date: Apr. 10, 2014

(87) PCT Pub. No.: WO2013/038848
PCT Pub. Date: Mar. 21, 2013

(65) Prior Publication Data
US 2014/0325787 A1    Nov. 6, 2014

(30) Foreign Application Priority Data

Sep. 13, 2011 (JP) ................. 2011-199353

(51) Int. Cl.
*B60S 1/34* (2006.01)
*B60S 1/24* (2006.01)
*B60S 1/04* (2006.01)

(52) U.S. Cl.
CPC ............... *B60S 1/34* (2013.01); *B60S 1/0452* (2013.01); *B60S 1/245* (2013.01)

(58) Field of Classification Search
CPC ........ B60S 1/34; B60S 1/0452; B60S 1/245; B60S 1/24; B60S 1/166
USPC ............... 15/250.3, 250.31, 250.27, 250.28, 15/250.29, 250.14
See application file for complete search history.

(56) References Cited

U.S. PATENT DOCUMENTS

| 8,136,199 B2 | 3/2012 | Nakamura et al. |
| 2003/0061677 A1 | 4/2003 | Neag et al. |

(Continued)

FOREIGN PATENT DOCUMENTS

| CN | 1680163 A | 10/2005 |
| CN | 1754727 A | 4/2006 |

(Continued)

OTHER PUBLICATIONS

Chinese Office Action for Chinese Patent Application No. 201280044444A dated Jul. 14, 2015 and the attached English Translation.

(Continued)

*Primary Examiner* — Monica Carter
*Assistant Examiner* — Andrew A Horton
(74) *Attorney, Agent, or Firm* — McCormick, Paulding & Huber LLP (57) ABSTRACT

A wiper apparatus is provided with: a wiper arm (14) which is swung about a rotation shaft (18); and a wiper motor (13) for generating drive power to be transmitted to the rotation shaft (18), the wiper apparatus is provided with a power transmission mechanism (19) for transmitting the drive power from the rotation shaft (18) to the wiper arm (14), the power transmission mechanism (19) is provided with: a link member (19a) fixed to the rotation shaft (18); and a support shaft (19b) fixed at a position on the link member (19a), which deviates from the rotation shaft (18), and configured to support the wiper arm (14), a coupling section between the support shaft (19b) and the wiper arm (14) is positioned in front of the front end of the front glass (11), and at least one part of the wiper motor (13) is located within the projection region of the front glass (11), thereby suppressing the increase in the number of parts.

2 Claims, 5 Drawing Sheets

(56) References Cited

U.S. PATENT DOCUMENTS

| | | |
|---|---|---|
| 2005/0217056 A1 | 10/2005 | Kagawa et al. |
| 2006/0053577 A1 | 3/2006 | Moein et al. |
| 2007/0261191 A1* | 11/2007 | Yagi .................. B60S 1/166 15/250.001 |
| 2008/0235895 A1* | 10/2008 | Tajima ................ B60S 1/0433 15/250.31 |
| 2009/0007362 A1 | 1/2009 | Hasegawa |
| 2009/0113654 A1* | 5/2009 | Nakamura ........... B60S 1/0433 15/250.34 |

FOREIGN PATENT DOCUMENTS

| | | |
|---|---|---|
| DE | 10 2005 052 036 A1 | 5/2007 |
| DE | 10 2008 031 261 A1 | 1/2009 |
| EP | 1 584 527 A2 | 10/2005 |
| JP | 2009-513442 A | 4/2009 |
| JP | 2009-113569 A | 5/2009 |
| JP | 2010-75005 A | 4/2010 |
| JP | 2010-188841 A | 9/2010 |
| WO | 2007/051688 A1 | 5/2007 |

OTHER PUBLICATIONS

European Search Report for European Patent Application No. EP12831128 dated Nov. 3, 2015.

International Seach Report for PCT Serial No. PCT/JP2012/070233 dated Oct. 24, 2012.

* cited by examiner

WIPER APPARATUS

CROSS-REFERENCE TO RELATED APPLICATION

This application is entitled to the benefit of and incorporates by reference subject matter disclosed in International Patent Application No. PCT/JP2012/070233 filed on Aug. 8, 2012 and Japanese Patent Application No. JP2011-199353 filed on Sep. 13, 2011.

TECHNICAL FIELD

The present invention relates to a wiper apparatus for driving and swinging a wiper arm provided above a windshield of a vehicle by a drive power of a wiper motor provided below the windshield, thereby wiping the windshield of the vehicle.

BACKGROUND ART

Conventionally, a wiper apparatus for wiping off substances attached on a windshield to secure a visual field of a driver is mounted on a vehicle. The wiper apparatus is configured to convert a rotation movement of an armature of a wiper motor into a swing movement of a wiper arm. As a type of a mechanism for converting the rotation movement of the armature of the wiper motor into the swing movement of the wiper arm, a direct drive (DD) type and a link type has been known. First, a direct drive type wiper apparatus is provided with: a worm formed on the armature; and a worm wheel meshing with the worm, one end of the wiper arm is directly fixed to a rotation shaft serving as a rotation center of the worm wheel. In this direct drive type, the rotation movement of the armature is converted into the rotation movement of the worm wheel, and the swing movement of the wiper arm about the rotation shaft is performed. That is, the rotation shaft also serves as a pivot shaft of the wiper arm at the same time. One example of the direct drive type wiper apparatus is described in U.S. Patent Application Publication No. 2006/0053577.

On the other hand, a link type wiper apparatus is provided with: a worm formed on the armature; a worm wheel meshing with the worm; a pivot shaft serving as a swing center of the wiper arm; and a link converting the rotation movement of the worm wheel into the swing movement of the wiper arm. One example of the link type wiper apparatus is described in Japanese Patent Application Publication No. 2009-113569 and Japanese Patent Application Publication No. 2009-513442.

Of these wiper apparatuses, the wiper apparatus described in Japanese Patent Application Publication No. 2009-113569 is provided with: a wiper motor which is rotated normally and reversely within a predetermined angle range; an output shaft which the rotation movement of the wiper motor is transmitted to; a motor link which is swung integrally with the output shaft; a link rod coupled to the motor link via a ball joint; a pivot shaft serving as a swing center of the wiper arm; and a pivot link which is swung integrally with the pivot shaft and coupled to the link rod via a ball joint. An object of the wiper apparatus described in Japanese Patent Application Publication No. 2009-113569 is to reduce a space in an engine room, in which the wiper apparatus is installed. Japanese Patent Application Publication No. 2009-113569 discloses that the wiper motor is provided within a projection range of the windshield in a vehicle interior. Incidentally, Japanese Patent Application Publication No. 2009-513442 does not disclose a wiper motor for generating a drive power for swinging the wiper arm.

SUMMARY OF THE INVENTION

Incidentally, in a vehicle which needs to be reduced in size in a longitudinal direction, a lower space positioned in front of a front window as a windshield tends to be reduced in size. Therefore, of parts constituting the wiper apparatus in the vehicle which needs to be reduced in size in the longitudinal direction, it is thought that the wiper motor may be preferably located on the rear side of the vehicle.

In the direct drive type wiper apparatus described in U.S. Patent Application Publication No. 2006/0053577, however, even if the wiper motor is preferably located on the rear side of the vehicle, since the rotation shaft of the worm wheel also serves as the pivot shaft of the wiper arm at the same time, the rotation shaft cannot be located behind a front end of the front window. Therefore, in the vehicle which needs to be reduced in size in the longitudinal direction, it was not possible to employ a layout where the wiper motor is preferably located on the rear side of the vehicle.

On the other hand, in the link type wiper apparatus described in Japanese Patent Application Publication No. 2009-113569, the wiper motor is located within the projection range of the windshield in the vehicle interior, and a layout where the wiper motor is preferably located on the rear side of the vehicle is employed, however, in order to transmit the rotation force of the output shaft of the wiper motor to the pivot shaft, the wiper apparatus described in Japanese Patent Application Publication No. 2009-113569 must be further provided with parts such as link rod, pivot link, and ball joint, as a result, it encounters a problem on the increase in the number of parts.

Furthermore, Japanese Patent Application Publication No. 2009-513442 discloses one example of the link type wiper apparatus, but fails to clearly explain how and where to suitably mount the wiper motor, it was not possible to employ a layout satisfying requirements for size reduction of a vehicle.

An object of the present invention is to provide a wiper apparatus in which a wiper motor can be preferably located on a rear side of a vehicle in a longitudinal direction of the vehicle, and it is possible to suppress the increase in the number of parts for transmitting a drive power from the wiper motor to an wiper arm.

A wiper apparatus according to the present invention has: a first wiper arm which wipes a windshield provided so as to surround a vehicle interior and performs swing movement around a pivot shaft; and a wiper motor provided below the windshield in a height direction of the vehicle, and configured to generate a drive power to be transmitted to the pivot shaft, the wiper apparatus comprising a power transmission mechanism for transmitting the drive power from the pivot shaft to the first wiper arm, the power transmission mechanism including: a swing member fixed to the pivot shaft and swung around the pivot shaft; and a first support shaft fixed at a position on the swing member, which deviates from the pivot shaft, and configured to support the first wiper arm, wherein with the first wiper arm stopped or swung, the first support shaft is provided in such a way that a coupling section between the first support shaft and the first wiper arm is positioned in front of a front end of the windshield; and at least one part of the wiper motor is located within a projection region of the windshield in a longitudinal direction of the vehicle on a plane along a horizontal direction of the vehicle.

The wiper apparatus according to the present invention, further comprises: a second wiper arm different in wiping region of the windshield from the first wiper arm, wherein the power transmission mechanism includes: a second support shaft fixed to an end portion of the second wiper arm; a first link member rotatably coupled at a position on the swing member, which deviates from the pivot shaft; and a second link member having one end rotatably coupled with the first link member and the other end fixed with the second support shaft; with the second wiper arm stopped or swung, the second support shaft is provided in such a way that a coupling section between the second support shaft and the second wiper arm is positioned in front of the front end of the windshield; and at least one part of the first link member and the second link member is located within the projection region of the windshield on the plane along the horizontal direction of the vehicle.

The wiper apparatus according to the present invention, further comprises: a clutch mechanism for connecting a power transmission route between the swing member and the wiper motor when a torque to be transmitted is smaller than a predetermined value, and disconnecting the power transmission route when a torque to be transmitted is equal to or larger than the predetermined value is provided to the power transmission route.

According to the wiper apparatus of the present invention, since at least one part of the wiper motor is located within the projection region of the windshield, the wiper motor is preferably located in the longitudinal direction of the vehicle by a distance corresponding to the distance between the pivot shaft and the first support shaft, so that it is possible to improve the layout of the wiper motor. Therefore, it is possible to satisfying requirements for size reduction of the vehicle. Furthermore, since the support shaft for supporting the first wiper arm is fixed to the swing member swinging together with the pivot shaft, when at least one part of the wiper motor is located behind the front end of the windshield in the longitudinal direction of the vehicle, it is unnecessary to newly provide a part for transmitting a drive power of the wiper motor to the first wiper arm, so that the number of parts can be inhibited from increasing.

According to the wiper apparatus of the present invention, at least one part of the first link member and the second link member is provided within the projection region of the windshield. Therefore, even in a wiper apparatus configured to swing the first wiper arm and the second wiper arm by the drive power of one wiper motor, a layout in which the wiper motor is preferably located on the rear side in the longitudinal direction of the vehicle can be employed.

According to the wiper apparatus of the present invention, the clutch mechanism for connecting the power transmission route when a torque to be transmitted is smaller than a predetermined value, and disconnecting the power transmission route when a torque to be transmitted is equal to or more than the predetermined value is provided in the power transmission route between the swing member and the wiper motor. Therefore, when a torque to be transmitted from the wiper motor to the swing member for swinging the wiper arm is smaller than the predetermined value, the power transmission route is in a connected state, so that it is possible to swing the wiper arm.

On the other hand, in swinging the wiper arm to wipe the windshield, when a wiping load becomes relatively large, and a torque to be transmitted to the power transmission route from the wiper arm becomes equal to or larger than a predetermined value, the power transmission route is disconnected by the clutch mechanism. Therefore, it is possible to avoid overload of the wiper motor, so that the wiper motor can be protected.

DETAILED DESCRIPTION

Hereinafter, one embodiment of the present invention will be described in detail with reference to the drawings.

(First Embodiment)

Figure 1:
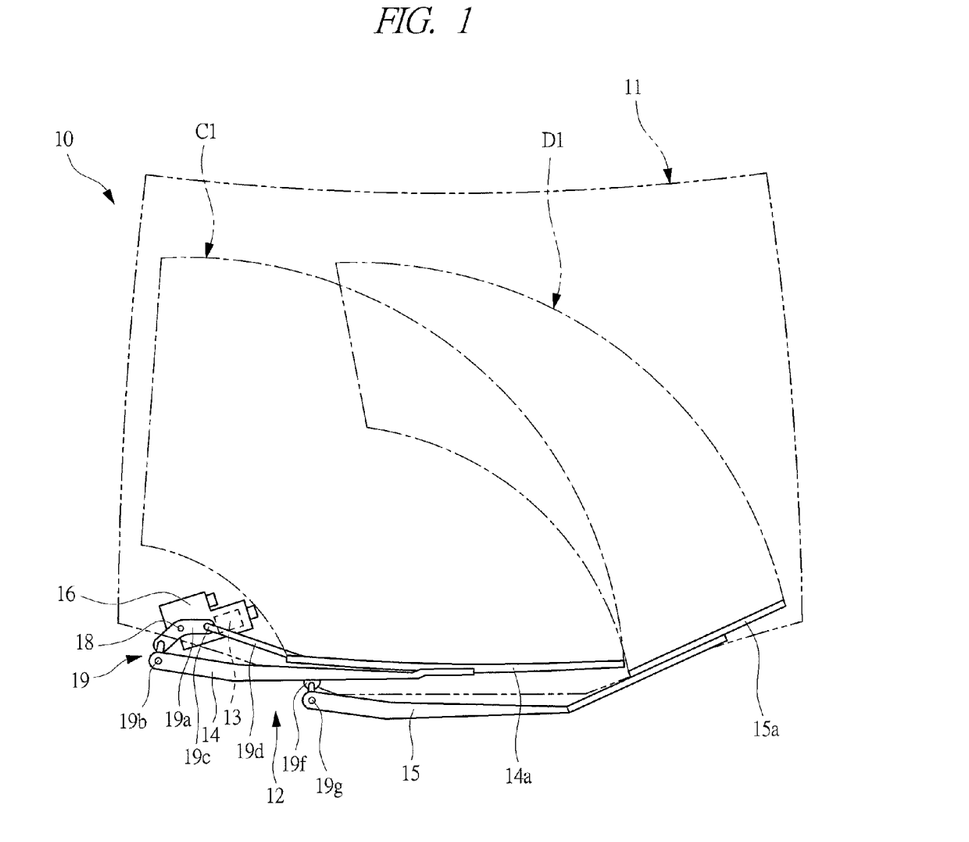
FIG. 1 is a schematic plan view showing a wiper apparatus according to the first embodiment of the present invention, mounted on a front section of a vehicle.
Figure 2:
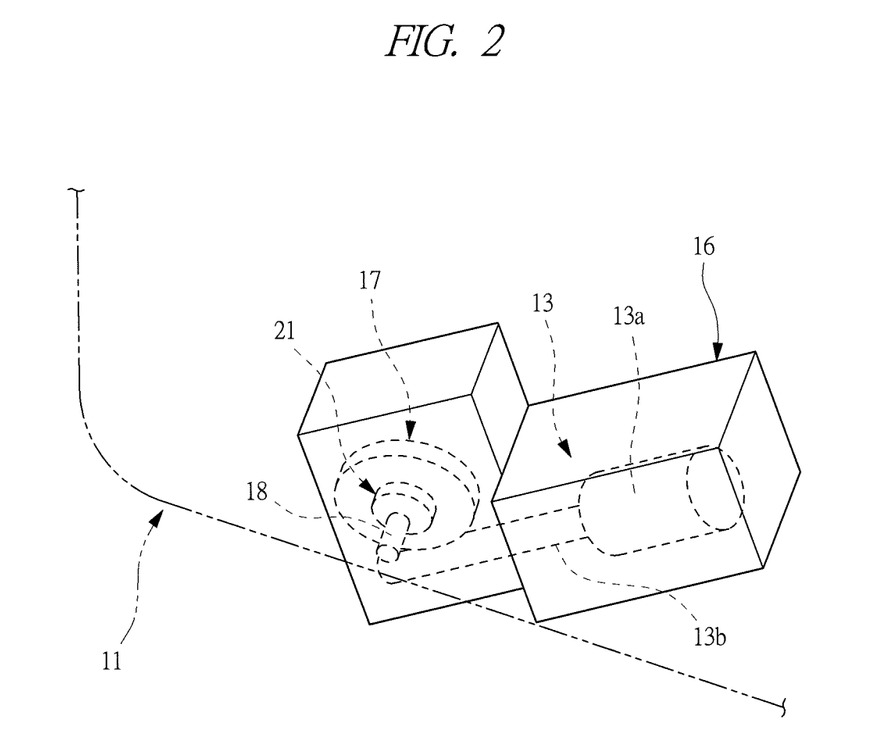
FIG. 2 is a schematic plan view showing a main section of the wiper apparatus shown in FIG. 1.
Figure 3:
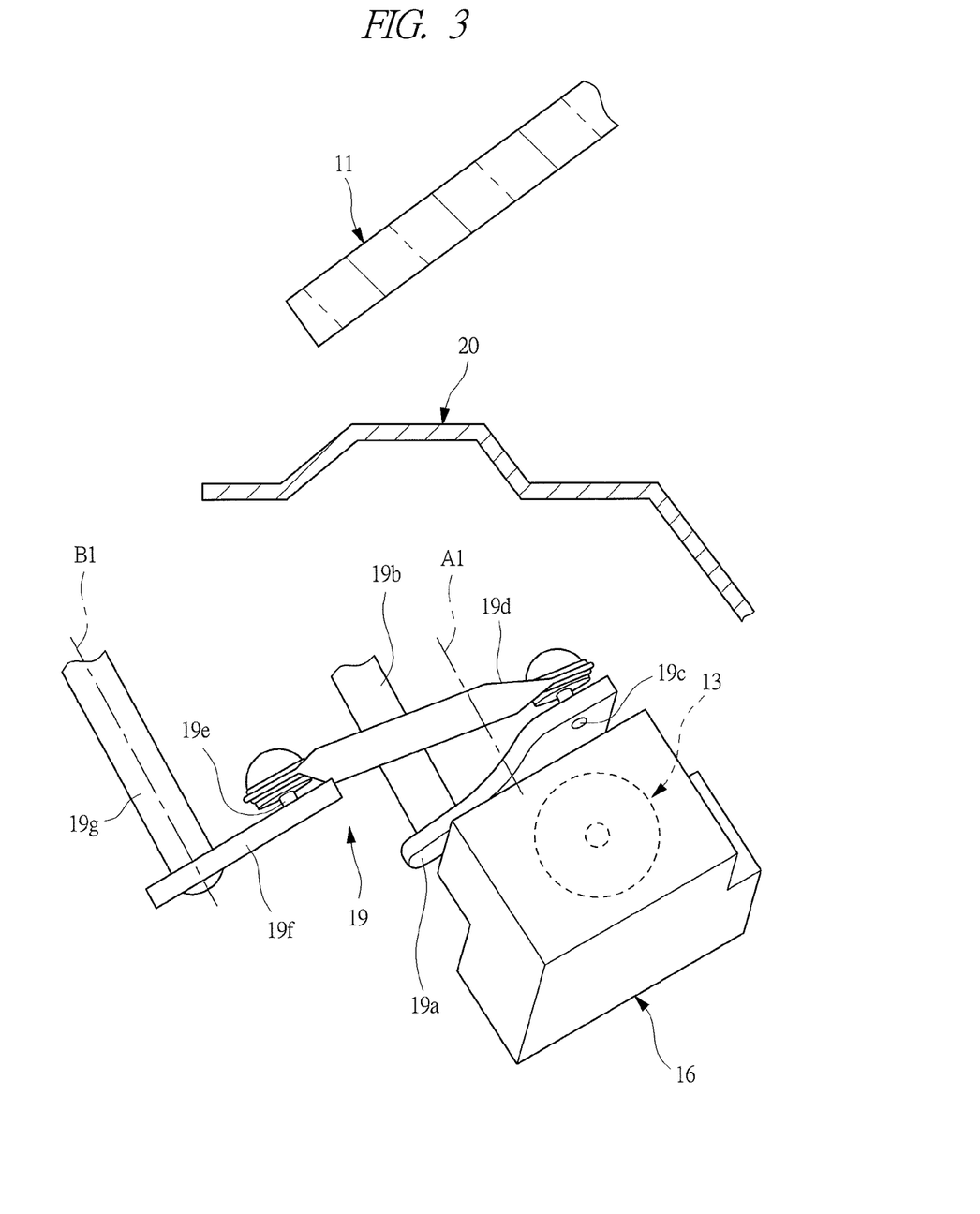
FIG. 3 is a schematic sectional side view showing the main section of the wiper apparatus shown in FIG. 1.

FIG. 1 is a schematic plan view showing a front section of a vehicle 10 provided with a wiper apparatus, FIG. 2 is a schematic plan view showing a main section of the wiper apparatus shown in FIG. 1, and FIG. 3 is a schematic sectional side view showing a main section of the wiper apparatus shown in FIG. 1. As shown in FIG. 1, a front glass 11 is provided on a front side of an interior of the vehicle 10 so as to surround the interior of the vehicle 10 (so as to form the interior of the vehicle). This front glass 11 is inclined in a longitudinal direction of the vehicle 10 so as to become progressively higher toward its rear end. In this embodiment, the term "longitudinal direction of the vehicle 10" means a direction along a traveling direction of the vehicle 10. Furthermore, as shown in FIG. 1, on a plane (not shown) along a horizontal direction of the vehicle 10, the front glass 11 has a shape curved so that a central portion of the front glass 11 in a width direction of the vehicle 10 projects forward in comparison with the other part of the front glass 11, and both ends thereof in the width direction of the vehicle 10 are located behind the central portion. A wiper apparatus 12 is provided in a range covering an upper portion, a front portion and a lower portion of the front glass 11.

Furthermore, a dashboard (not shown) is provided to a front and lower section of the interior of the vehicle 10, and a bulkhead 20 constituting a section of a vehicle body is provided in front of the dashboard, as shown in FIG. 3. The bulkhead 20 is a plate-like member provided below the front glass 11 and along a width direction (crosswise direction) of the vehicle 10. A forefront of the bulkhead 20 is located in front of the forefront of the front glass 11 in the longitudinal direction of the vehicle 10. Incidentally, side members (not shown) are provided at both sides of the bulkhead 20 in the width direction (crosswise direction) of the vehicle 10.

The above-described wiper apparatus 12 is configured to wipe off substances such as snow, rain water, dusts, bird dropping and the like (which are not shown) attached to the front glass, and to secure (clear) a visual field of a driver. The wiper apparatus 12 has: a wiper motor 13 which is rotated within a predetermined range or stopped according to operations of a wiper switch (not shown) provided in the interior of the vehicle 10; and wiper arms 14 and 15 which are swung within a predetermined angle range by with a drive power transmitted from the wiper motor 13.

In this first embodiment, a so-called "tandem type" wiper apparatus configured to cause one wiper motor 13 to swing two wiper arms 14 and 15 is explained. The wiper arm 14 is located on the left side as viewed from the front of the vehicle 10, and the wiper arm 14 is defined as a wiper arm on a driver's seat side (DR side) for convenience sake. A wiper blade 14a is attached to a distal end of the wiper arm 14, and the wiper blade 14a comes in contact with the front glass 11. The wiper arm 15 is located on the right side as viewed from the front of the vehicle 10, and the wiper arm 15 is defined as a wiper arm on a front passenger's seat side (AS side) for convenience sake. The wiper arm 14 and 15 thus configured are different in wiping area of the front glass 11 from each other.

In a height direction of the vehicle 10, a casing 16 is provided below the bulkhead 20, and the wiper motor 13 is housed in the casing 16. In one example shown in FIG. 1, the casing 16 is located at a position closer to the left side as viewed from the front of the vehicle 10. The wiper motor 13 has a stator (not shown) configured so as not to rotate, an armature 13a provided so that it is axially aligned with the stator and rotatable, and a rotation shaft 13b provided so as to integrally rotate with the armature 13a. A whole circumference of the rotation shaft 13a is formed with a worm (not shown). The wiper motor 13 is composed of an electric motor such as for example DC motor with brush. Furthermore, the wiper motor 13 is a reversible motor which can rotate the rotation shaft 13b in the normal and reverse directions.

And at least one part of the wiper motor 13 is, on a plane along the horizontal direction of the vehicle 10, located behind the front end of the front glass 11 and within a projection region (projection range) of the arranged front glass 11. Here, each of "the front end of the front glass 11" and "the front end of the bulkhead 20" mean an end portion thereof in the longitudinal direction of the vehicle 10. Incidentally, the term "front end" means "front end" in the width direction (crosswise direction) of the vehicle 10, and does not mean "forefront" in the whole area in the width direction of the vehicle 10. In FIG. 1 and FIG. 2, the projection region where the front glass 11 is located is shown by an alternate long and two short dashes line. Incidentally, FIG. 1 and FIG. 2 show one example in which almost all of the wiper motor 13 is located in the projection region where the front glass 11 is located.

Furthermore, a worm wheel 17 having an outer circumference formed with a gear meshing with the worm is provided in the casing 16, and the worm wheel 17 is configured to rotate around the rotation shaft 18. Furthermore, the worm wheel 17 and the rotation shaft 18 are configured to rotate integrally with each other. Thus, when the rotation shaft 13b rotates normally and reversely, the rotation shaft 18 repeats normal and reverse rotation movements within a predetermined angle range. Furthermore, as shown in FIG. 3, an axis line "A1" serving as a rotation center of the rotation shaft 18 is inclined in the front direction of the vehicle 10 in side section along the longitudinal direction of the vehicle 10. One end portion of the rotation shaft 18 is exposed outside the casing 16.

Furthermore, a power transmission mechanism 19 configured to transmit drive power of the rotation shaft 18 to the wiper arms 14 and 15 is located outside the casing 16. The power transmission mechanism 19 has a link member 19a which is swung integrally with the rotation shaft 18. The link member 19a is fixed to the rotation shaft 18 at a central portion thereof in a longitudinal direction thereof, and a support shaft 19b is fixed to one end portion of the link member 19a. The support shaft 19b is fixed to one end portion of the wiper arm 14, and the support shaft 19b is an element constituting the power transmission mechanism 19. The support shaft 19b is located on a circle of a predetermined radius centered at the rotation shaft 18. That is, when the rotation shaft 18 repeats normal and reverse rotation movements, the wiper arm 14 is factually swung within a predetermined angle range while centered at the rotation shaft 18. That is, the rotation shaft 18 also functions as a pivot shaft serving as a rotation center of the wiper arm 14 at the same time.

Then, a configuration of a section for transmitting drive power to the wiper arm 15 in the power transmission mechanism 19 will be described. The link member 19a has: one end fixed to the support shaft 19b; and an opposite side end coupled to one end of the link member 19d via a coupling shaft 19c. A coupling section between the support shaft 19b and the wiper arm 15 is provided in front of the front end of the front glass 11 in the longitudinal direction of the vehicle 10.

On the other hand, an upper end of the support shaft 19b is located at the same height position as the front end of the front glass 11 or at a position higher than the height of the front end of the front glass 11. An axis line (not shown) serving as a rotation center of the support shaft 19b is inclined in the front direction of the vehicle 10 in side section along the longitudinal direction of the vehicle 10. A center-to-center distance between the rotation shaft 18 and the support shaft 19b and an inclination angle of the support shaft 19b are determined so that, even in each of a case where the rotation shaft 18 is stopped or a case where the rotation shaft 18 rotates normally and reversely so as to swing the link member 19a, the support shaft 19b is not brought into contact with the bulkhead 20 and the front glass 11.

Furthermore, a link member 19f is coupled to the other end of the link member 19d via a coupling shaft 19e. An opposite side end of this link member 19f from the coupling shaft 19e is fixed to the wiper arm 15 via a support shaft 19g. Since the support shaft 19g is rotatably supported by a bearing (not shown), the support shaft 19g is not moved in a radial direction. The support shaft 19g is a pivot shaft serving as a rotation center of the wiper arm 15.

In the rotation shaft 18 and the support shaft 19g thus coupled to each other, the axis line "A1" of the rotation shaft 18 and the axis line "B1" of the support shaft 19g are kept parallel with each other regardless of whether the rotation shaft 18 is rotated or stopped. Furthermore, on a horizontal plane along the longitudinal direction of the vehicle 10, at least one part of he link members 19d and 19f is located behind the front end of the front glass 11 and within a projection region of the front glass 11. Furthermore, a coupling section between the support shaft 19g and the wiper arm 15 is positioned in front of the projection region of the front glass 11 in the longitudinal direction of the vehicle 10. Furthermore, the support shaft 19g is also located so that the axis line "B1" serving as the rotation center of the support shaft 19g is inclined in the front direction of the vehicle 10.

Next, control and operation of the wiper apparatus 12 in the first embodiment will be described. First, when the wiper switch is operated so as to cause the wiper motor 13 repeat normal and reverse rotation movements alternately, the worm wheel 17 rotates in normal and reverse directions. The rotation angle range of the wiper motor 13 is preliminarily determined on the basis of target action ranges to be respectively wiped by the wiper blades 14a and 15a. Therefore, the rotation shaft 18 repeats normal and reverse rotation movements, and the link member 19a is swung around the axis line "A1" within the predetermined angle range. Therefore, the wiper arm 14 is swung around the rotation shaft 18 within the predetermined angle range, so that a region "C1" of a surface of the front glass 11 shown by an alternate long and short dash line is wiped by the wiper blade 14a.

On the other hand, when the link member 19a is swung within the predetermined angle range, a drive force thereof is transmitted to the link member 19f via the link member 19d, so that the support shaft 19g repeats normal and reverse rotation movements within the predetermined angle range. Therefore, the wiper arm 15 is swung around the support shaft 19g within the predetermined angle range, so that a region "D1" of a surface of the front glass 11 shown by an alternate long and short dash line is wiped by the wiper blade 15a. In this manner, the surface of the front glass 11 is wiped by the wiper blades 14a and 15a, so that it is possible to secure a visual field of a driver.

Now, in the first embodiment, the support shaft 19b is located so that, even in each of a case where the wiper arm 14 is being swung and a case where the wiper arm 14 is stopped, a coupling portion between the support shaft 19b and the wiper arm 14 is located in front of the front end of the front glass 11 in the longitudinal direction of the vehicle 10. Accordingly, the support shaft 19b is not brought into contact with the front glass 11. Furthermore, the link member 19a is configured so that it is swung around the rotation shaft 18, and the support shaft 19b is provided on the link member 19a at a position deviating from the rotation shaft 18. Furthermore, at least one part of the wiper motor 13, specifically, almost all thereof, is located within the projection region of the front glass 11. Therefore, the wiper motor 13 can be preferably located on the rear side in the longitudinal direction of the vehicle 10, so that layout (or vehicle-mountability) of the wiper motor 13 can be improved. More specifically, the wiper motor 13 can be preferably located on the rear side of the vehicle 10 by a distance corresponding to the center-to-center distance between the rotation shaft 18 and the support shaft 19b. Therefore, an arrangement space for parts in a lower space located in front of the front glass 11 can be reduced, so that it is possible to satisfy requirements for size reduction of the vehicle 10.

Furthermore, since the center-to-center distance between the rotation shaft 18 and the support shaft 19b is relatively short, it is possible to avoid deterioration in parts-mounting workability. Furthermore, since the wiper motor 13 can be located in a space below the front glass 11, for example, when the front section of the vehicle 10 comes in contact with a collision material, the front section of the vehicle body can be deformed easily, and an impact from the outside can be absorbed easily.

Furthermore, since the center-to-center distance between the support shaft 19b and the rotation shaft 18 is secured by the singular link member 19a, an increase in the number of parts can be inhibited in the first embodiment as compared with configuration of a plurality of parts newly coupled to one another serially in order to preferably lengthen the center distance. Therefore, a space for parts in a space below and in front of the front glass 11 can be reduced securely, and it is possible to avoid weight increase due to the increase in the number of parts.

In addition, the wiper arm 14 is attached to the link member 19a via the support shaft 19b, and the wiper arm 15 is coupled to the link member 19a via the link members 19d and 19f. Therefore, a tandem type wiper apparatus configured to swing the two wiper arms 14 and 15 by drive power of one wiper motor 13 can be improved in layout of the wiper motor 13.

Furthermore, when the rotation shaft 18 and the support shafts 19b and 19g are attached to the vehicle 10 so that they are inclined in the front direction of the vehicle 10, it is possible to employ a configuration in which the wiper motor 13 is set on the upper side without changing the positions of the rotation shaft 18 and the support shafts 19b and 19g. By employing this configuration, even if rain water stands in a space having the casing 16 located therein, it is possible to avoid the wiper motor 13 from being submerged in water.

Incidentally, in this first embodiment, it is also possible to provide a clutch mechanism 21, as shown in FIG. 2, in a power transmission route between the worm wheel 17 and the rotation shaft 18 so that the worm wheel 17 and the rotation shaft 18 are coupled to each other and integrally rotated with each other. The clutch mechanism 21 serves as a torque limiter which has a function to connect the power transmission route when a torque to be transmitted between the wiper motor 13 and the rotation shaft 18 is smaller than a predetermined value, and disconnect the power transmission route when the torque to be transmitted between the wiper motor 13 and the rotation shaft 18 is equal to or larger than the predetermined value. In the clutch mechanism 21, the torque as a border between the connection and the disconnection in the power transmission route is obtained on the basis of such conditions as strength, rigidity, and durability of each part of the wiper motor 13. Furthermore, it goes without saying that the predetermined value of the torque is larger than the torque which is transmitted from the wiper motor 13 to the link member 19a.

This clutch mechanism having a torque limiting function is a well-known technique, therefore, illustrations of this mechanism are omitted, and one example in Japanese Patent Application Laid-Open Publication No. 2010-75005 may be used. The clutch mechanism described in this publication is configured to press a friction member by a spring member, thereby performing power transmission between a first rotation member and a second rotation member by friction force. The first rotation member is configured to rotate integrally with a worm wheel, while the second rotation member is configured to rotate integrally with a rotation shaft. And this mechanism is configured to perform a slipping operation so as to disconnect the power transmission route when a torque exceeding the frictional force is transmitted. In the clutch mechanism described in this Publication, for example, a torque constituting a border between the connection and disconnection of the power transmission route can be arbitrarily changed by changing an elastic force (spring constant) of the spring.

By providing the clutch mechanism 21 in this manner, when the wiper motor 13 is rotated so that the rotation torque is transmitted to the link member 19a, the clutch mechanism 21 connects the power transmission route so that the wiper arms 14 and 15 are swung and the front glass 11 is wiped. On the other hand, when an excessive load acts on the wiper arms 14 and 15 at the time of wiping the front glass 11 due to a large amount of snow accumulated on the surface of the front glass 11 or excrescence firmly adhered to the surface, and a torque inputted into the clutch mechanism 21 by a reaction force of this excessive load reaches a predetermined value, the clutch mechanism 21 disconnects the power transmission route. Therefore, it is possible to prevent the excessive load from acting on the wiper motor 13 to lower durability and damage it. That is, the clutch mechanism 21 acts as a protection device for protecting the wiper motor 13 from an external force. Therefore, in order to secure the strength of the wiper motor 13 against an external force, it is not necessary to increase a bearing size, thicken the casing 16 or the like at the time of designing a wiper apparatus, so that it is possible to avoid the wiper motor 13 and the casing 16 from being increased in size.

(Second Embodiment)

Figure 4:
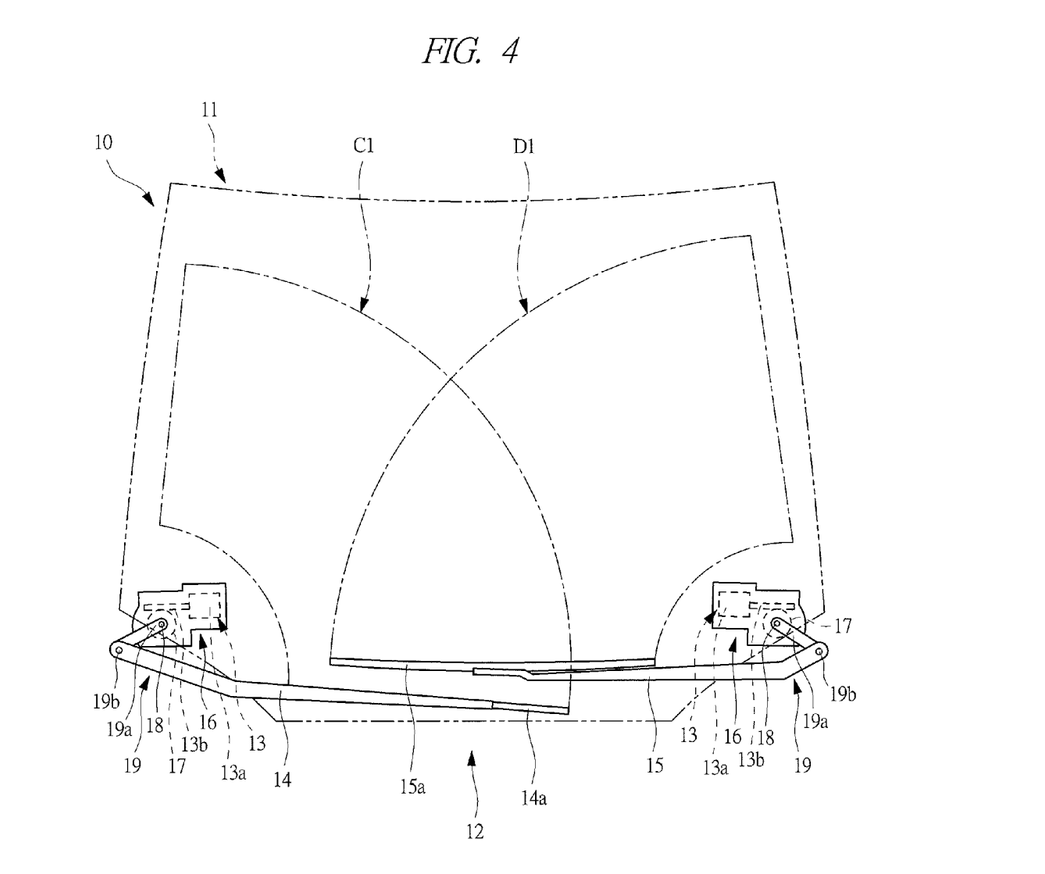
FIG. 4 is a schematic plan view showing a wiper apparatus according to the second embodiment of the present invention, mounted on a front section of a vehicle.
Figure 5:
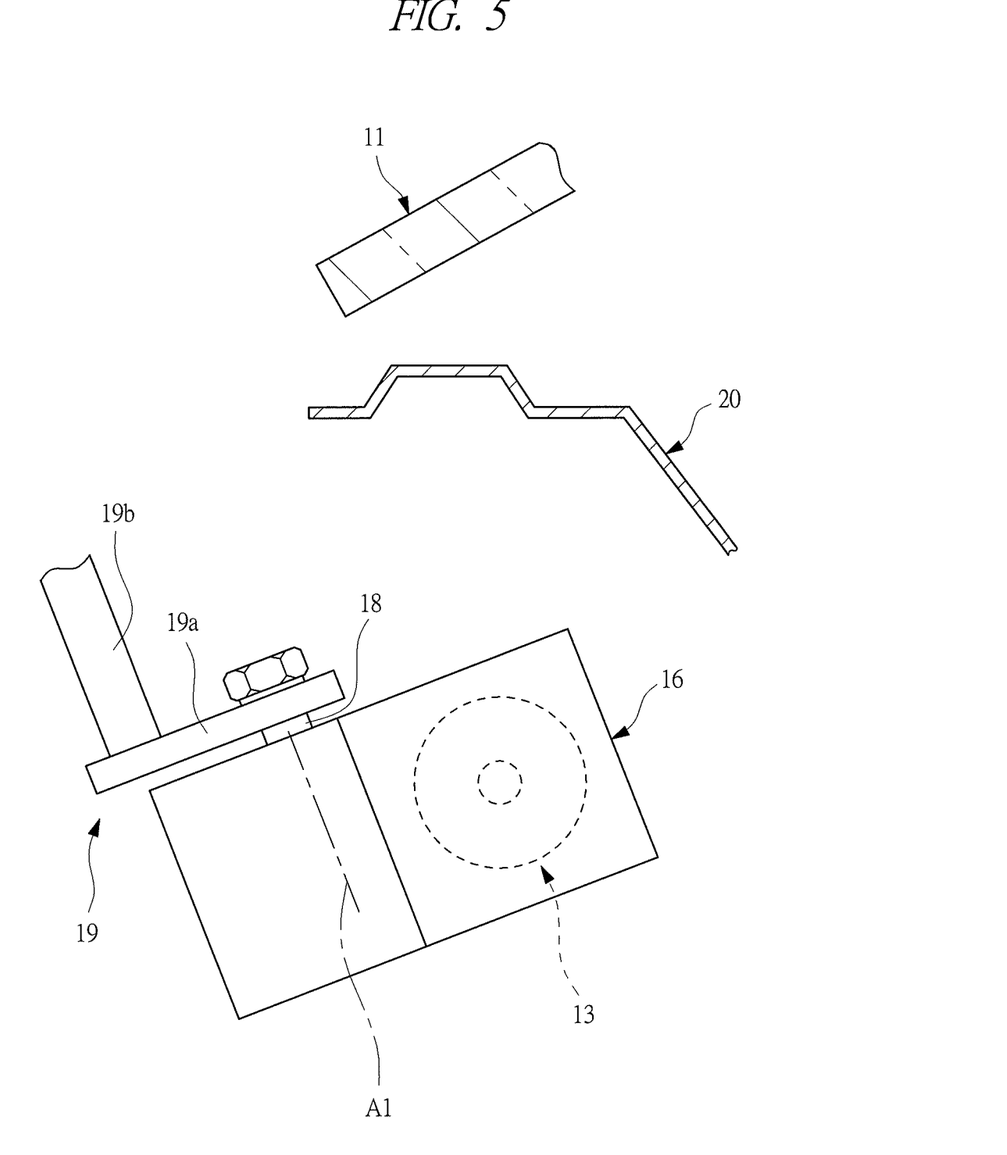
FIG. 5 is a schematic sectional side view showing a main section of the wiper apparatus shown in FIG. 4.

FIG. 4 is a schematic plan view showing a front section of the vehicle 10 provided with the wiper apparatus 12. FIG. 5 is a schematic sectional side view showing a main section of the wiper apparatus 12 in FIG. 4. In FIG. 5, elements the same as those of FIGS. 1 to 3 are denoted by the same reference numbers as those of FIGS. 1 to 3, and the detail description of those elements is omitted. The wiper apparatus 12 of the second embodiment is provided with: a wiper motor 13 for swing a driver's seat side wiper arm 14; and a wiper motor 13 for swing a passenger's seat side wiper arm 15, and called "opposite type" wiper apparatus. These wiper motors 13 are located at a predetermined interval in the width direction of the vehicle 10.

In this embodiment, the wiper motor 13 for swing the driver's seat side wiper arm 14 and the wiper motor 13 for swing the passenger's seat side wiper arm 15 are the same as each other in configuration, and differ from each other in that they are located symmetrically. Furthermore, the power transmission mechanism 19 for transmitting drive power to the driver's seat side wiper arm 14 and the power transmission mechanism 19 for transmitting drive power to the passenger's seat side wiper arm 15 are the same as each other in configuration, and differ from each other in that they are located symmetrically. Therefore, the configuration of the power transmission mechanism 19 for the driver's seat side wiper arm 14 and the configuration of the power transmission mechanism 19 for the passenger's seat side wiper arm 15 will be collectively described hereinafter.

Even in the second embodiment, the wiper motor 13 is composed of a reversible motor capable of rotating the rotation shaft 18 normally and reversely. Furthermore, on a plane along a horizontal direction of the vehicle 10, at least one part of the wiper motor 13 is located behind the front end of the front glass 11, and within a projection region (projection range) of the located front glass 11. Furthermore, it is provided with a link member 19*a* which is swung integrally with the rotation shaft 18, and the support shaft 19*b* is fixed to one end of the link member 19*a*. This support shaft 19*b* is fixed to one end of the wiper arm 14. A coupling section between the support shaft 19*b* and the wiper arm 14 is positioned in front of the front end of the front glass 11 in the longitudinal direction of the vehicle 10. Furthermore, the other support shaft 19*b* is fixed to one end of the wiper arm 15. A coupling section between the support shaft 19*b* and the wiper arm 15 is positioned in front of the front end of the front glass 11 in the longitudinal direction of the vehicle 10. Incidentally, in the second embodiment, it is not provided with the coupling shaft 19*c* explained in the first embodiment, and the link member 19*a* has an elongated shape.

Next, control and operation of the wiper apparatus 12 in the second embodiment will be described. First, when the driver's seat side wiper motor 13 repeats normal and reverse rotation movements alternately, the link member 19*a* is swung around the axis line "A1" within the predetermined angle range, and the wiper arm 14 is swung around the support shaft 19*b* within the predetermined angle range. According to this action, a region "C1" of a surface of the front glass 11 shown by an alternate long and short dash line is wiped by the wiper blade 14*a*.

On the other hand, when the passenger's seat side wiper motor 13 repeats normal and reverse rotation movements alternately, the link member 19*a* is swung around the axis line "A1" within the predetermined angle range, and the wiper arm 15 is swung around the support shaft 19*b* within a predetermined angle range. According to this action, a region D1 of a surface of the front glass 11 shown by an alternate long and short dash line is wiped by the wiper blade 15*a*. Incidentally, when the two wiper motors 13 are simultaneously driven, the rotational range of the wiper motor 13, and a positional relationship between the wiper arms 14 and 15 are determined such that the wiper arm 14 and the wiper blade 14*a*, and the wiper arm 15 and the wiper blade 15*a* do not come in contact with each other.

Even in the second embodiment, on a plane along a horizontal direction of the vehicle 10, at least one part, specifically, almost all of the wiper motor 13 is located behind the front end of the front glass 11, and within the projection region of the front glass 11 in the longitudinal direction of the vehicle 10. The link member 19*a* is attached to the rotation shaft 18 to which the drive power of the wiper motor 13 is transmitted, and the coupling portions between the support shaft 19*b* and the wiper arms 14 and 15 are located in front of the front end of the front glass 11 in the longitudinal direction of the vehicle 10. Therefore, the wiper motor 13 can be preferably located on the rear side in the longitudinal direction of the vehicle 10. Specifically, a layout where the wiper motor 13 is located on the rear side by a distance corresponding to the center-to-center distance between the rotation shaft 18 and the support shaft 19*b* can be employed. Therefore, an advantageous effect similar to that of the first embodiment can be obtained.

Furthermore, since the center-to-center distance between the support shaft 19*b* and the rotation shaft 18 is secured by one link member 19*a*, an advantageous effect the same as that of the first embodiment can be obtained. Furthermore, since the rotation shaft 18 and the support shaft 19*b* are attached the vehicle 10 so as to be inclined in the front direction of the vehicle 10, an advantageous effect the same as that of the first embodiment can be obtained. Incidentally, in the second embodiment, the clutch mechanism explained in the first embodiment may be provided to the power transmission route between the link member 19*a* and the wiper motor 13.

Then, relationship between the configuration described in the above embodiment and the configuration of the present invention will be described, the front glass 11 corresponds to "windshield" in this invention, the wiper arm 14 corresponds to "first wiper arm" in this invention, the rotation shaft 18 corresponds to "pivot shaft" in this invention, the link member 19*a* corresponds to "swing member" in this invention, and the support shaft 19*b* corresponds to "first support shaft" in this invention. Furthermore, the wiper arm 15 corresponds to "second wiper arm" in this invention, the support shaft 19*g* corresponds to "second support shaft" in this invention, the link member 19*d* corresponds to "first link member" in this invention, and the link member 19*f* corresponds to "second link member" in this invention.

Furthermore, the present invention is not limited to the above-described embodiments, and it goes without saying that the present invention can be variously modified without departing from the gist thereof. For example, the first embodiment can also be applied to a vehicle where a wiper motor is located on the right side as viewed from the front of the vehicle. Furthermore, in the first and second embodiments, the clutch mechanism 21 can be provided between the rotation shaft 18 and the like member 19a instead of providing the clutch mechanism 21 between the worm wheel 17 and the rotation shaft 18. Furthermore, each link member in the present invention is an element for transmitting the power of a wiper motor to a wiper arm, and the shape of each link member may be any one of an elongated shape, a rod shape, a semilunar shape, an oval shape, and the like. Furthermore, the number of sets of a wiper arm and a wiper motor may be one, three or more when the wiper apparatus 12 of an opposite type explained in the second embodiment is provided. In the above embodiments, the example where the axis line "A1" of the rotation shaft 18 and the axis line "B1" of the support shaft 19g are kept parallel with each other has been shown, but the present invention is not limited to this example, and the axis line "B1" of the support shaft 19g may be held so as to be inclined to the axis line "A1" of the rotation shaft 18 in order to cause the wiper arm to act according to the curvature of the front glass 11 to improve wiping performance.

The wiper apparatus according to the present invention can be applied for swinging a wiper arm by a drive power of a wiper motor to wipe a windshield.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper apparatus comprising:
    a first wiper arm which wipes a windshield provided so as to surround a vehicle interior and performs swing movement around a pivot shaft; and
    a wiper motor provided below the windshield in a height direction of the vehicle, and configured to generate a drive power to be transmitted to the pivot shaft, the wiper motor being housed in a casing, the pivot shaft extending from the casing, wherein
    the wiper apparatus comprises a power transmission mechanism for transmitting the drive power from the pivot shaft to the first wiper arm,
    the power transmission mechanism includes: a swing member fixed to the pivot shaft and swung around the pivot shaft; and a first support shaft fixed at a position on the swing member, which deviates from the pivot shaft, and configured to support the first wiper arm,
    with the first wiper arm stopped or swung, the first support shaft is provided in such a way that a coupling section between the first support shaft and the first wiper arm is positioned in front of a front end of the windshield,
    at least one part of the wiper motor is located within a projection region of the windshield in a longitudinal direction of the vehicle on a plane along a horizontal direction of the vehicle,
    the wiper apparatus further comprises a second wiper arm different in wiping region of the windshield from the first wiper arm,
    the power transmission mechanism further includes: a second support shaft fixed to an end portion of the second wiper arm; a first link member rotatably coupled at a position on the swing member, which deviates from the pivot shaft; and a second link member having one end rotatably coupled with the first link member and the other end fixed with the second support shaft,
    with the second wiper arm stopped or swung, the second support shaft is provided in such a way that a coupling section between the second support shaft and the second wiper arm is positioned in front of the front end of the windshield;
    at least one part of the first link member and the second link member is located within the projection region of the windshield on the plane along the horizontal direction of the vehicle,
    a longitudinal central portion of the swing member is fixed to the pivot shaft,
    one longitudinal end portion of the swing shaft is coupled to the first support member at a position which deviates from the pivot shaft, and
    the other longitudinal end portion of the swing member is coupled to the first link member.

2. The wiper apparatus according to claim 1, further comprising: a clutch mechanism for connecting a power transmission route between the swing member and the wiper motor when a torque to be transmitted is smaller than a predetermined value, and disconnecting the power transmission route when a torque to be transmitted is equal to or larger than the predetermined value is provided to the power transmission route.

* * * * *

UNITED STATES PATENT AND TRADEMARK OFFICE
CERTIFICATE OF CORRECTION

PATENT NO. : 9,493,139 B2
APPLICATION NO. : 14/344206
DATED : November 15, 2016
INVENTOR(S) : Koji Iwazaki et al.

It is certified that error appears in the above-identified patent and that said Letters Patent is hereby corrected as shown below:

On the Title Page

Item (56), in the section titled OTHER PUBLICATIONS, please remove "201280044444A" and replace with --201280044444.4--.

Signed and Sealed this
Seventh Day of March, 2017

Michelle K. Lee
*Director of the United States Patent and Trademark Office*